United States Patent
Fries et al.

(10) Patent No.: US 11,702,119 B2
(45) Date of Patent: Jul. 18, 2023

(54) METHOD FOR DETERMINING A STATUS OF A TRACK SECTION OF A RAILROAD; ASSOCIATED APPARATUS AND NON-TRANSITORY COMPUTER READABLE MEDIUM

(71) Applicant: ALSTOM Transport Technologies, Saint-Ouen-sur-Seine (FR)

(72) Inventors: Jeffrey Fries, Grain Valley, MO (US); Chris Schuchmann, Melbourne, FL (US); Richard Lawson, Melbourne Beach, FL (US); Shawn Clark, Melbourne, FL (US); John Ross, Melbourne, FL (US)

(73) Assignee: ALSTOM Transport Technologies, Saint-Ouen-sur-Seine (FR)

( * ) Notice: Subject to any disclaimer, the term of this patent is extended or adjusted under 35 U.S.C. 154(b) by 0 days.

(21) Appl. No.: 17/316,361

(22) Filed: May 10, 2021

(65) Prior Publication Data

US 2022/0355841 A1 Nov. 10, 2022

(51) Int. Cl.
*B61L 25/06* (2006.01)
*G01V 3/02* (2006.01)
*G01N 27/04* (2006.01)

(52) U.S. Cl.
CPC ............ *B61L 25/06* (2013.01); *G01N 27/041* (2013.01); *G01V 3/02* (2013.01)

(58) Field of Classification Search
CPC .......... B61L 25/06; G01N 27/041; G01V 3/02
See application file for complete search history.

(56) References Cited

U.S. PATENT DOCUMENTS

| | | | |
|---|---|---|---|
| 2007/0132463 A1* | 6/2007 | Anderson | B61L 1/181 324/713 |
| 2008/0296441 A1* | 12/2008 | Anderson | B61L 23/044 246/121 |

* cited by examiner

*Primary Examiner* — Jay Patidar
(74) *Attorney, Agent, or Firm* — Knobbe, Martens, Olson & Bear, LLP

(57) ABSTRACT

A method is for determining a status of a track section of a railroad. Each end of the track section is connected to a respective detector. One of the two detectors transmits a current along the rails of the track section towards the other detector and receives a current transmitted along the rails of the track section from the other detector. The track section is further equipped with a computer in communication with the two detectors. The computer calculates an instant value of the status of the track section as a function of an instant vector based on a measure of an intensity of the current transmitted by a first of the detectors as measured by the first detector (Tx$l_1$), a measure of an intensity of the current received by the first detector as measured by the first detector (Rx$l_1$) and a measure of an intensity of the current transmitted by the second detector as measured by the second detector (Tx$l_2$).

13 Claims, 3 Drawing Sheets

METHOD FOR DETERMINING A STATUS OF A TRACK SECTION OF A RAILROAD; ASSOCIATED APPARATUS AND NON-TRANSITORY COMPUTER READABLE MEDIUM

BACKGROUND

1. Field

The present invention pertains to methods and apparatuses for determining a status of a track section of a railroad, this status being an occupancy status and/or an operative status of the monitored track section.

2. Description of the Related Art

For signaling purposes, a railroad is subdivided in a plurality of successive track sections.

At each time, the occupancy status of each track section has to be known. The different values of the occupancy status of a track section may be "occupied" or "not occupied" (or even "not determined").

It is well known to monitor the occupancy status of a track section by means of a track circuit associated with said track section.

Existing track circuits use measurements of currents received at one end of a circuit incorporating the rails of the monitored track section, from a transmitter at the opposite end of the circuit. The level of the current received is indicative of the presence of the axle of a train that creates a shunt between the rails of the track section. Existing track circuits correspond to train detection systems.

However, train detection based on track circuits, in particular coded DC track circuits, have three significant limitations.

Firstly, the length of the track circuit is limited to approximately 24,000 feet. Beyond this length, the fraction of the current received at one end of the track section is too weak to distinguish between an occupied or an unoccupied track section.

Secondly, changes in weather/seasons often necessitate manual adjustment of received current detection thresholds above which the track section is said to be "not occupied" and under which the track section is said to be "occupied".

Thirdly, incorrect threshold adjustment may produce unsafe or unreliable operation of the track circuit.

Existing track circuits thus have an insufficient reliability or safety margin. An error in the determination of the status of a track circuit (false clear) affects directly the safety of train circulation.

SUMMARY OF THE INVENTION

This invention addresses these issues by proposing a method with superior performance, employing a multi-dimensional analysis of key track circuit characteristic quantities.

A first aspect of the present invention provides a method for determining a status of a track section of a railroad the track section comprising first and second ends, the first end, respectively the second end, being electrically connected to a first detection device, respectively to a second detection device, the first detection device being capable of transmitting a current along the rails of the track section towards the second detection device and of receiving a current transmitted along the rails of the track section from the second detection device, the track section being further associated with a computing unit, such as a computer, the first and second detection devices being in communication with the computing unit, the computing unit calculating an instant value of the status of the track section as a function of an instant vector of measures that comprises: a first coordinate corresponding to a measure of an intensity of the current transmitted by the first detection device as measured by the first detection device; a second coordinate corresponding to a measure of an intensity of the current received by the first detection device as measured by the first detection device; and a third coordinate corresponding to a measure of an intensity of the current transmitted by the second detection device as measured by the second detection device.

A second aspect of the present invention provides an apparatus for determining a status of a track section of a railroad, the apparatus comprising a computing unit and first and second detection devices, the first and second detection devices being in communication with the computing unit, the track section comprising first and second ends, the first detection device, respectively the second detection device being configured to be electrically connected to the first end, respectively to the second end, the first detection device being capable of transmitting a current along the rails of the track section towards the second detection device and receiving a current transmitted along the rails of the track section from the second detection device, wherein the computing unit is programmed so as to realize the previous method.

A third aspect of the present invention provides a non-transitory computing unit readable medium comprising instructions stored thereon, the instructions, when executed by a processor, being adapted to realize the previous method.

Advantageously, the track circuit according to the invention provides detection/indication of a potential break in the rails making up the track section monitored.

Advantageously, an additional aspect of the invention provides a method for directing rail traffic on the track section of a railroad by implementing the foregoing methods and apparatuses. In this aspect, when the method or apparatus identifies that the track section is occupied or is faulty, rail traffic is diverted away from the relevant track section, and when the method or apparatus identifies that the track section is not occupied or is not faulty, rail traffic is directed through the track section.

DETAILED DESCRIPTION

Figure 1:
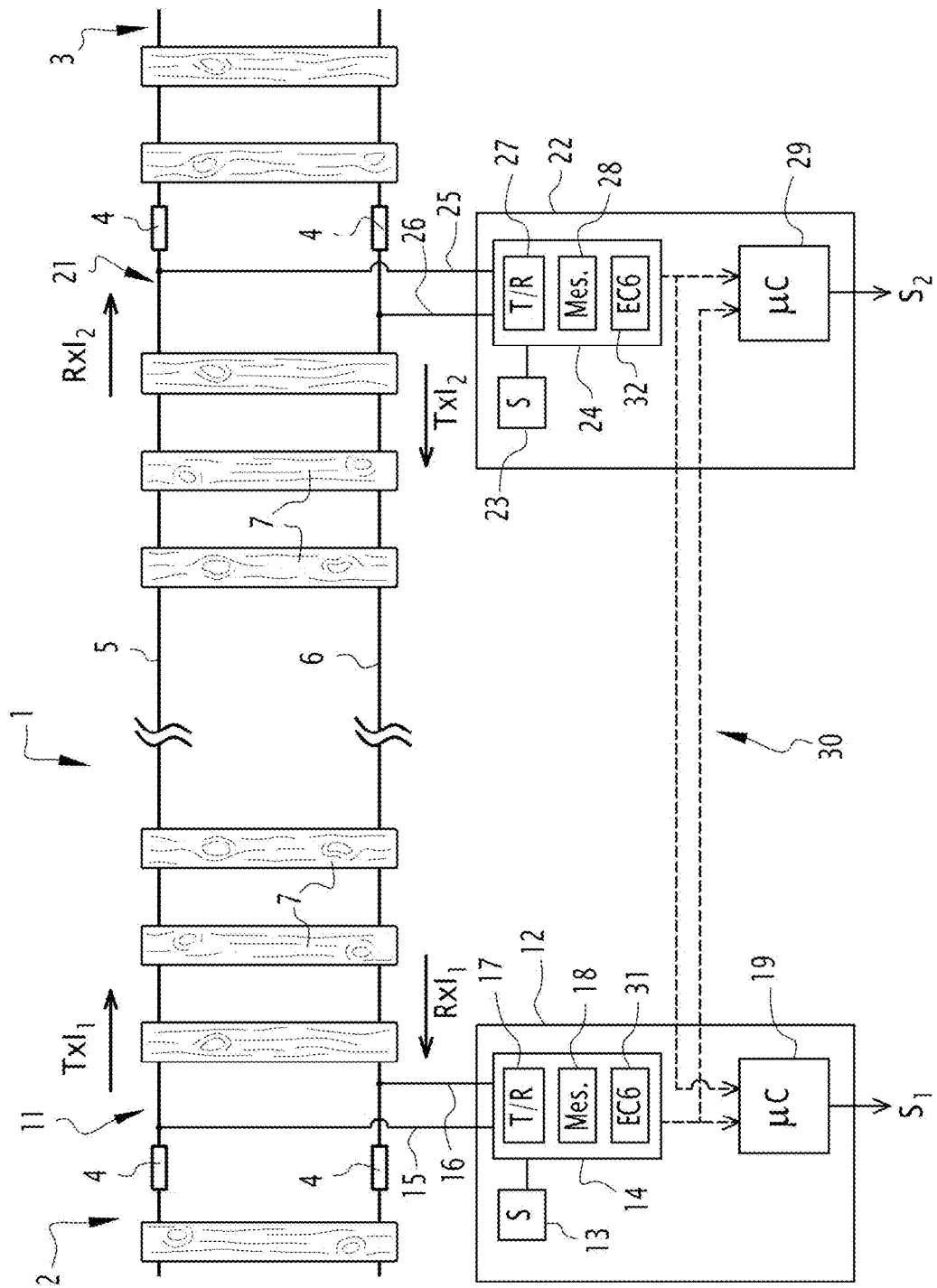
FIG. 1 illustrates schematically the preferred embodiment of an apparatus to determine an occupancy status of a track section of a railroad according to the invention.

FIG. 1 represents a track section of a railroad, which is equipped with an apparatus according to a preferred embodiment of the invention, in order to determine a status of said track section. In the preferred embodiment, the apparatus determines an occupancy status of the track section it equips. Alternatively, the apparatus determines, in addition to the occupancy status or in place of the occupancy status, an operative status of said track section.

The railroad is subdivided into successive track sections. In FIG. 1, three track sections are shown, respectively 1, 2 and 3.

Each track section is made of a pair of rails (or succession of rails). For example, track section 1 is made of rails 5 and 6. The rails are maintained by crossties 7.

The track sections are of the type "one entry-one exit". This means that track section 1 comprises only two ends, namely a first end 11 and a second end 21.

Each track section is electrically insulated from its two adjacent track sections by insulation joints. As illustrated in FIG. 1, insulation joints 4 are interposed between each rail of track section 1 and the corresponding rails of the previous track section 2 and the corresponding rails of the next track section 3.

Each end of a track section is equipped with a monitoring system. The first end 11 of track section 1 is provided with a first monitoring system 12, whereas the second end 21 is provided with a second monitoring system 22. The first and second monitoring systems, 12 and 22, are in communication through a communication link.

The apparatus according to the invention thus comprises the first monitoring system 12, the second detection system 22, and the communication link between them.

The first monitoring system 12 comprises a first electrical power source 13, a first detector 14 (i.e. first detection device), which includes a transceiver 17 (i.e. a transceiver/receiver module) and an ammeter (i.e. a measurement module), and a first computer 19 (i.e. a first computing unit).

The first detection device 14 is provided with two terminals, which are electrically connected to the first end 11, respectively to rail 5 through cable 15 and to rail 6 through cable 16. Typically, there will be protective circuitry between the detection device 14 and the cables 15 and 16.

The first detection device 14 is electrically connected to the first electrical power source 13, which is preferably a DC source.

The first detection device 14 is in communication with the first computing unit 19, through for example a communication bus of the first monitoring system 12.

By means of the transceiver/receiver module 17, the first detection device 14 is able to apply, at the first end 11, a first current transmitted along the rails 5 and 6 towards the second monitoring system 22; and to collect, at the first end 11, a second current transmitted along the rails 5 end 6 by the second monitoring system 22.

By means of the measurement module 18, the first detection device 14 is able to measure the intensity of the first current transmitted by the first detection device 14 at the first end 11, called Tx11. It is also able to measure the intensity of the second current received by the first detection device 14 at the first end 11, called Rx11.

A similar description of the second monitoring system 22 could be made. A component of the second monitoring system which is identical to a component of the first monitoring system is identified by the reference numeral used to identified said component of the first monitoring system increased by ten.

More precisely, the second monitoring system 22 comprises a second electrical power source 23, a second detector 24 (i.e. second detection device), which includes a transceiver 27 (i.e. a transceiver/receiver module) and an ammeter 28 (i.e. a measurement module), and a second computer 29 (i.e. second computing unit).

The second detection device 24 presents two terminals, which are respectively connected to the second end 21 of the track section 1, respectively to rail 5 through cable 25 and to rail 6 through cable 26.

By means of the transceiver/receiver module 27, the second detection device 24 is capable to apply, at the second end 21 of track section 1, a second current towards the first detection device 14, and to collect, at the second end 21, a first current received from the first detection device 14.

By means of the measurement module 28, the second detection device 24 is capable to measure the intensity of the second current transmitted by the second detection device 24 at the second end 21, called Tx12. It is also capable to measure the intensity of the first current received by the second detection device 24 at the second end 21, called Rx12.

The first and second monitoring systems 12, 22 are in communication one with the other.

In an embodiment, the communication between the first and second monitoring systems is established through a dedicated wired communication link 30 such as a discrete wire or cable.

In another embodiment, a wireless communication link can be used for the communication between these two systems.

In yet another embodiment, which is a preferred solution, the communication link is of the type power line communication along the rails of the track section. The communication is then established between the two systems by using the first and second detection devices 14, 24 to exchange signal along the rails 5 and 6 of the track section monitored. For example, this is done by superimposing a current signal over a carrier current between the first and second transceiver/receiver modules 17, 27. In this embodiment, the first and second detection devices then comprise an additional module, respectively 31, 32, for coding/decoding the messages exchanged. Preferably, the EC6 protocol is used.

Utilizing such an power line communication link, the first transceiver/receiver module 17 is able to receive the intensity of the second transmitted current measured by the second detection device 24 at the second end 21, called Tx12. Similarly, the second transceiver/receiver module 27 is able to receive the intensity of the first transmitted current measured by the first detection device 14 at the first end 11, called Tx11.

The first computing unit 19 thus receives, at time t, three measures:
- a first measure Tx11 of an intensity of the current transmitted by the first detection device 14 as measured by the first detection device 14;
- a second measure Rx11 of an intensity of the current received by the first detection device 14 as measured by the first detection device 14; and
- a third measure Tx12 of an intensity of the current transmitted by the second detection device 24 as measured by the second detection device 24.

These three measures form a vector of measures V, more precisely an instant vector of measures V(t). These three measures may be measured at time t or near time t (in order to take into account the lack of synchronization between the monitoring systems and the communication delay to transmit one measure from one system to the other).

A vector of measures has thus three coordinates. It belongs to a space of measures which is a three dimensional space. Each dimension of this space corresponds to one of the coordinates of the vector of measures, i.e. the quantities that are acquired by the first computing unit 19.

In an alternative, the first computing unit 19 also receives, from the second monitoring device, a fourth measure Rx12, of an intensity of the current received by the second detection device 24 as measured by the second detection device 24. In this case, the four measures form the vector of measures V, which then belongs to a four dimensional space of measures.

From the instant current vector of measures, V(t), the first computing unit 19 determines a first occupancy status S1 of the track section 1.

Symmetrically, the second computing unit 29 receives, at time t, three measures: Tx12, Rx12, and Tx11. These measures form an instant vector of measures V, from which the second computing unit 29 determines a second occupancy status S2 of the track section 1.

In the preferred embodiment, the first and second occupancy statuses S1 and S2 will reflect the actual occupancy of the track section 1 without upper level signaling infrastructure reconciling them before use.

In an alternative embodiment, the first and second occupancy statuses S1 and S2 are sent to an upper level of the signaling infrastructure (not shown in FIG. 1). After a vote mechanism for the reconciliation of S1 and S2, a final occupancy status of track section 1 is computed for use in the managing of the railroad.

In an alternative, the apparatus only comprises one computing unit that is common to the first and second detection devices, leading to the calculation of one instant value for the status of the track section.

Figure 2:
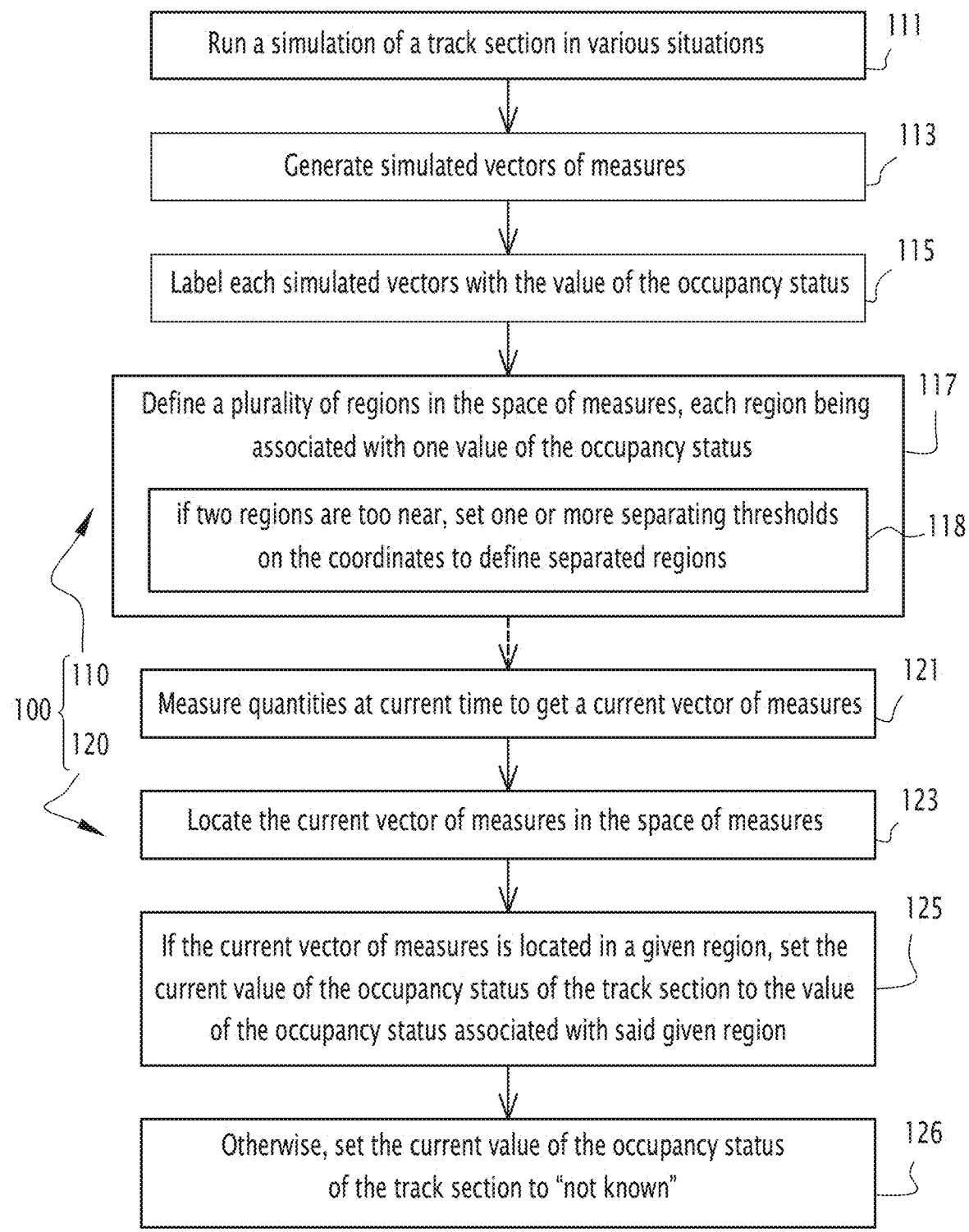
FIG. 2 illustrates the preferred embodiment of a method, performed in part by the apparatus according to FIG. 1, for determining an occupancy status of a track section; and, FIG. 3 illustrates a three-dimension space of measures used in the method according to FIG. 2.

FIG. 2 illustrates a preferred embodiment of a method for determining a status of a track section of a railroad according to the invention, said track section being equipped with the apparatus as presented above.

The method 100 comprises a first phase 110 and a second phase 120.

The first phase 110 is an offline preprocessing phase consisting in modelling the behavior of a generic track section in different situations, in order to define characteristic regions in the space of measures, each region corresponding to a specific value of the occupancy status of the track section.

The second phase 120 is an online processing phase consisting in acquiring a instant vector of measures and locating it in the space of measures as a result of phase 110. The instant value of the occupancy status of the track section is then equal to the label of the region wherein the instant vector of measures is located.

More specifically, phase 110 starts with step 111 consisting in running a simulation of the electric behavior of a generic track section, whose electrical and dimensional parameters are set to those of track section 1.

The simulation is run for various situations: the track circuit is not shunted; the track circuit is shunted with different numbers of rail car axles; the track circuit is shunted at different points along the length of the track section, etc. Preferably, a range of rail, connection, and ballast impedances are also simulated.

In particular, the most challenging "occupied" situation is simulated, which corresponds to a worst case shunt, as effected by a single rail car, since this situation provides the least change in the received current compared to a "not occupied" situation.

For each situation, the three quantities Tx11, Rx11, Tx12 are computed and a simulated vectors of measures is obtained (step 113).

In step 115, each simulated vectors of measures are labeled with the value of the occupancy status corresponding to the situation simulated.

Once a sufficient number of simulation vectors of measures have been generated and labelled, they are positioned in the three-dimensional space of measures.

The space of measures is then subdivided in a plurality of regions (step 117). This subdivision results from an algorithm applied on the simulated vectors of measures in order to define regions so that each region envelops the greatest number of vectors of measures labelled with the same value of the occupancy status, without including any vectors of measures labelled with another value (or at least to minimize the number of vectors of measures labelled with another value). The computational algorithm is for example an algorithm called "alpha shapes" to determine the boundary of each region. This allows an efficient determination of a received vector being inside or outside the boundary of a region. But other type of algorithms can be used, in particular, statistical algorithms.

Each region is then identified with the value of the occupancy status of the vectors of measures it regroups.

Figure 3:
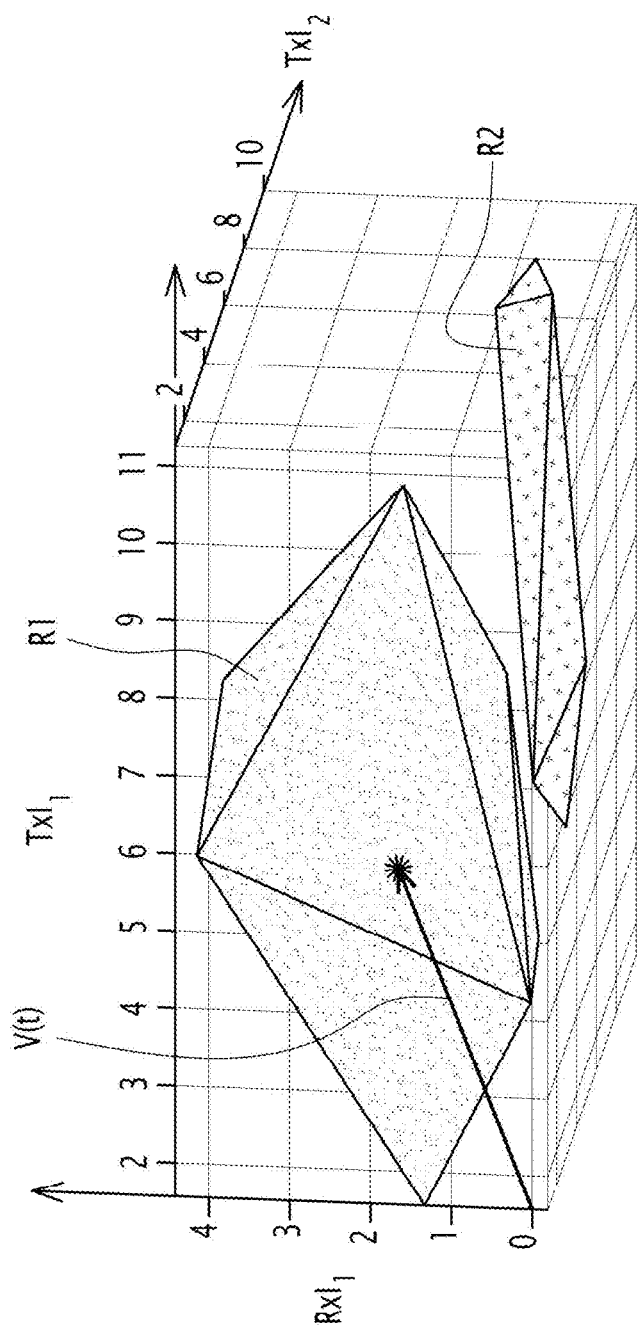

FIG. 3 illustrates the output of step 117 in the three-dimensional space of measures defined by coordinates Tx11, Rx11, Tx12. In this example, two regions are delimited in the space of measures, respectively a first region R1 corresponding to the value "Occupied" of the occupancy status of the track section, and a second region R2 corresponding to the value "Not Occupied" of the occupancy status of the track section.

Generally speaking, the different regions are clearly separated one from the other when considering a space of measures having three or four dimensions. This is not the case when considering only two dimensional spaces of measures, for example when only the currents Tx1 and Rx1 measured at one end of the track section are taken into account.

However, in particular for very long track section (above around 24000 feet/7300 m), the "occupied" and "not occupied" regions may be too near one from the other in the three-dimensional space, or even may partially overlap one with the other. This could lead to an ambiguity on the value of the occupancy status of the track section.

Advantageously, step 118 is then performed in order to set thresholds for defining clearly separated regions in the space of measures. Such a threshold can be a specific value or a function of values of the coordinates of the space of measures. Alternatively, such a threshold is a variable that can be set by an operator during a deployment of the apparatus on site or during maintenance of this apparatus.

Phase 110 ends with the delimitation of regions in the space of measures,

The corresponding data file is stored in the memory of each computing unit 19, 29 of the apparatus that equips track section 1.

The method 100 then moves to the second phase 120, which is periodically performed by each computing unit 19, 29 in real time.

Considering the first computing unit 19, phase 120 begins with step 121 consisting in measuring the different relevant quantities, i.e. the instant currents transmitted and received at the first end 11 by the first detection device 14 and the instant current transmitted at the second end 21 by the second detection device 24. These quantities are quantized, placed into messages and communicated to the first computing unit 19. These measures form an instant vector of measures V(t).

In the following step 123, the instant vector of measures V(t) is located in the space of measures as defined by the file stored in the memory of the first computing unit 19.

If the instant vector of measures V(t) is located inside a particular region of the space of measures (step 125), the first instant value S1 of the occupancy status of the track section 1 is set to the value of the occupancy status identifying said particular region.

Preferably, otherwise (step 126), the first instant value S1 of the occupancy status of the track section 1 is set to the value "Not Known".

For example, if V(t) lies in the first region R1, then S1 takes the value "Occupied" and if V(t) lies in the second region R2, then S1 takes the value "Not Occupied". Preferably if V(t) lies outside the first region R1 and the second region R2, S1 takes the value "Not Known".

The second computing unit 29 also performs phase 120 to calculate independently the second instant value S2 of the of the occupancy status of the track section 1.

In some embodiments, the first and second values, S1 and S2, are sent to an upper level of the signaling infrastructure for reconciliation and the determination of the final status of the track section monitored.

Advantageously, the present method may be adapted to define, in addition to regions corresponding to the occupancy status of the track section, regions corresponding to an operative status of said track section. By operative status, it is understood the capacity to detect that one of the rails of the track section monitored is broken. For example, the operative status can take the values "OK" (or "non faulty") or "Broken" (or "Faulty").

Detecting broken rails takes advantage of multidimensional measurements. A key observation is that a rail break would significantly reduce the received current, for example Rxl1, without increasing the transmitted current, Txl1, unlike the presence of one or more rail cars on the track section, which would cause transmitted current, Txl1 or Txl2, to increase at one or both ends of the track section and the receive current, Rxl1, to decrease. In phase 110, a situation corresponding to a rail break is modelled by a lumped resistance in one of the rails of the track section simulated.

What is claimed is:

1. A method for determining a status of a track section of a railroad, the track section comprising first and second ends, a first rail and a second rail, wherein the first end and the second end are electrically connected to a first detector and a second detector, respectively, and wherein the first and second detectors are in communication with at least one computer, the method comprising:
   by the first detector, transmitting a first current along the first rail of the track section towards the second detector,
   by the second detector, receiving the first current and transmitting a second current along the second rail of the track section toward the first detector,
   by the first detector, receiving the second current,
   by the at least one computer, calculating an instant value of the status of the track section as a function of an instant vector of measures that comprises:
      a first coordinate corresponding to a measure of an intensity of the first current as measured by the first detector;
      a second coordinate corresponding to a measure of an intensity of the second current as measured by the first detector; and
      a third coordinate corresponding to a measure of an intensity of the second current as measured by the second detector.

2. The method according to claim 1, wherein the instant vector of measures comprises a fourth coordinate corresponding to a measure of an intensity of the first current received as measured by the second detector.

3. The method according to claim 1, wherein the status of the track section is an occupancy status whose value is selected between a first value corresponding to a non occupied track section and a second value corresponding to an occupied track section, and/or an operative status whose value is selected between a third value corresponding to a non faulty track section and a fourth value corresponding to a faulty track section.

4. The method according to claim 1, wherein the at least one computer being integrated with the first detector in a first monitoring system, the second detector communicates to the at least one computer by way of the transmission of a communication signal along the rails of the track section towards the first detector.

5. The method according to claim 1, wherein the at least one computer calculates the instant value of the status of a track section by:
   reading a data file defining a plurality of regions in a space of measures, each dimension of the space of measures being associated with the corresponding coordinate of the instant vector of measures, each region of the plurality of regions being associated with the value of the status of the track section;
   locating the instant vector of measures in the space of measures; and,
   when the instant vector of measures is located inside a specific region of the plurality of regions, considering that the instant value of the status of the track section is equal to the value of the status of the track section with which the specific region is associated.

6. The method according to claim 5, wherein the data file is obtained by an offline preprocessing phase which comprises the steps of:
   running a simulation modeling an electrical behavior of the track section in different situations in order to generate simulated vectors of measures;
   labelling each simulated vectors of measures with the value of the status of the track section corresponding to the situation simulated;
   delimiting the plurality of regions in the space of measures, one particular region of the plurality of regions regrouping simulated vectors of measures labelled with a same value of the status of the track section, said same value of the status of the track section being used to identify said particular region.

7. The method according to claim 6, wherein, when two regions of the plurality of regions are overlapping one with the other, the method further comprises the step of setting a threshold on at least one dimension of the space of measures in order to delimit two regions that are separated one from the other.

8. The method according to claim 1, wherein the track section is electrically insulated from adjacent track sections.

9. A non-transitory computer readable medium comprising instructions stored thereon, the instructions, when executed by the computer, cause the computer to execute the method according to claim 1.

10. An apparatus for determining a status of a track section of a railroad, wherein the track section comprises first and second ends, a first rail, and a second rail, the apparatus comprising:
- at least one computer, and
- a first and a second detectors,
- wherein the first and second detectors are in communication with the at least one computer,
- wherein the first detector and the second detector are electrically connected to the first end and the second end, respectively,
- wherein the first detector is configured to transmit a first current along the first rail of the track section towards the second detector and the second detector is configured to receive the first current,
- wherein the second detector is configured to transmit a second current along the second rail towards the first detector and the first detector is configured to receive the second current, and
- wherein the at least one computer is configured to calculate an instant value of the status of the track section as a function of an instant vector of measures that comprises:
  - a first coordinate corresponding to a measure of an intensity of the first current as measured by the first detector;
  - a second coordinate corresponding to a measure of an intensity of the second current as measured by the first detector; and
  - a third coordinate corresponding to a measure of an intensity of the second current as measured by the second detector.

11. The apparatus according to claim 10, wherein a communication link is established between the first and second detectors.

12. The apparatus according to claim 11, wherein the communication link is a power line communication link along the rails of the track section.

13. The apparatus according to claim 10, wherein the track section is electrically insulated from adjacent track sections.

* * * * *